United States Patent
Hollinger

(10) Patent No.: US 7,411,310 B2
(45) Date of Patent: Aug. 12, 2008

(54) PRECISION ALIGNMENT HUB

(75) Inventor: Ted Hollinger, Algona, IA (US)

(73) Assignee: Hydrogen Engine Center, Inc., Algona, IA (US)

( * ) Notice: Subject to any disclaimer, the term of this patent is extended or adjusted under 35 U.S.C. 154(b) by 27 days.

(21) Appl. No.: 11/100,651

(22) Filed: Apr. 7, 2005

(65) Prior Publication Data

US 2006/0226658 A1  Oct. 12, 2006

(51) Int. Cl.
  *B60L 11/02* (2006.01)
  *B61C 9/38* (2006.01)
(52) U.S. Cl. .................................................. 290/45
(58) Field of Classification Search .................. 290/45
  See application file for complete search history.

(56) References Cited

U.S. PATENT DOCUMENTS

| | | | | |
|---|---|---|---|---|
| 4,212,098 A * | 7/1980 | Sand | | 29/460 |
| 4,235,101 A * | 11/1980 | Stadelmann | | 73/116 |
| 4,295,276 A * | 10/1981 | Ellington, III | | 33/644 |
| 5,458,100 A * | 10/1995 | Neuenfeld | | 123/195 A |
| 5,952,746 A * | 9/1999 | Mittmann et al. | | 310/42 |
| 6,133,659 A * | 10/2000 | Rao | | 310/89 |
| 6,204,577 B1 * | 3/2001 | Chottiner et al. | | 310/42 |
| 6,253,437 B1 * | 7/2001 | Levin | | 29/271 |
| 6,527,091 B2 * | 3/2003 | Klode | | 188/164 |
| 6,624,543 B1 * | 9/2003 | Bankstahl | | 310/91 |
| 6,659,723 B2 * | 12/2003 | Bankstahl | | 416/185 |
| 6,842,967 B2 * | 1/2005 | Wingeier | | 29/598 |
| 6,904,885 B2 * | 6/2005 | Osband | | 123/195 R |
| 6,951,112 B2 * | 10/2005 | Czachor | | 60/798 |
| 6,951,443 B1 * | 10/2005 | Blakemore | | 415/4.3 |
| 2003/0037757 A1 * | 2/2003 | Osband | | 123/195 R |
| 2003/0095867 A1 * | 5/2003 | Bankstahl | | 416/204 R |
| 2003/0188419 A1 * | 10/2003 | Wingeier | | 29/598 |
| 2005/0172641 A1 * | 8/2005 | Czachor | | 60/796 |
| 2007/0085429 A1 * | 4/2007 | van der Woude | | 310/64 |

* cited by examiner

*Primary Examiner*—Darren Schuberg
*Assistant Examiner*—Pedro J Cuevas
(74) *Attorney, Agent, or Firm*—Kent A. Herink; Emily E. Harris

(57) ABSTRACT

A distributed generator system is provided having an alignment hub to assist in the alignment and securement of an engine and a generator of the system. The system comprises a distributed generator system having an engine and a single bearing generator, and an alignment hub for defining an alignment position between the engine and the generator and maintaining the alignment within a predetermined tolerance.

8 Claims, 4 Drawing Sheets

PRECISION ALIGNMENT HUB

BACKGROUND OF THE INVENTION

1. Field of the Invention

The present invention relates to an alignment hub for a distributed generator system. In particular, the invention comprises an alignment hub for defining an alignment position between an engine and a single bearing generator and maintaining the alignment within a predetermined tolerance.

2. Background

Distributed generator systems, or gensets, are electric generating facilities used for a variety of purposes. Gensets are found in industry, home, marine and many other environments where there is a need to generate electricity. Most commonly a genset consists of an engine, typically an internal combustion engine, linked to an electrical generator.

The basic configuration of a genset comprises an internal combustion engine linked with some type of an adaptor to a generator. The adaptor forms a releasably secure connection that aligns the crankshaft of the engine to the rotor shaft of the generator. Power is transferred from the engine to the generator through this connection. In particular, with internal combustion engines a flywheel, which is an energy storage system in the form of a rotating mass mounted on a crankshaft of the engine, is connected to a flex plate located on the generator that can drive the rotor shaft of the generator. Through this connection, engine power is transferred to the generator for the purpose of generating electricity. Generally, the flex plate and the flywheel are joined together with a plurality of bolts located along the outer circumference of the two pieces. An adaptor plate is secured around the combination to secure and seal the connection between the flex plate and the flywheel.

Frequently, the engine used in gensets is diesel powered. Diesel engines operate most efficiently at relatively low rpms. For example, diesel engines used in gensets typically operate at 1500 rpms for 50-hertz power or at 1800 rpms for 60-hertz power. This power range works well for diesel engines, and places relatively little demand on the precision of the alignment between the engine and the generator. At such lows rpms, vibration resulting from improper alignment is not critical.

In some cases gasoline internal combustion engines have been used with gensets, however, the results have been less than successful. The optimum power range of gasoline engines is much higher than diesel engines. For example, gasoline engines normally operate at 3000 rpms for 50-hertz power or at 3600 rpms for 60-hertz power. Relatively high rpm operation creates a problem that is exacerbated by the drive to reduce engine emissions. A variety of devices have been developed to reduce the nitrous oxide ($NO_x$) emissions. This is generally accomplished by making the engines run very lean. Internal combustion engines produce less power when running lean than when running stoichiometric. To produce more power means running the engines at even higher rpms.

The need to run at such high rpms places great demand on the alignment between the engine and the generator in a genset. The higher the rpms the more vibration that occurs. Also, due to the fact that gensets normally rely on diesel engines that run at low rpms the demand for precession alignment has been low, and techniques for alignment are poorly evolved. The worse the alignment the greater the vibration. Vibration causes excess wear, fatigues bearings, weaken points of connection, and presents a safety issue. Over time vibration can cause the bolts that connect the flywheel and the flex plate to fail, and the engine and generator can separate while operating. These components are typically large and heavy, and injury to property or person can easily result form such operational failure.

Generally, alignment is determined by the location holes on the flywheel and the flex plate. Perfect alignment results when the axis of rotation of the engine crankshaft is precisely coincident with the axis of rotation of the generator rotor shaft. In practice, the fact that the boltholes are not precisely machined, the perimeter location of the bolts holes, and play in the boltholes all contribute to poor alignment. The effect of the weight of the genset components also contributes to the alignment problem. The components are quite heavy, especially in larger gensets. This weight settles on the bolts and peens and distorts the boltholes, which quickly distorts the alignment. Furthermore, operational stress causes a similar problem.

As a result, the use of modem gasoline internal combustion engines, or any type of engine that operates at relatively high rpms, in gensets has been difficult to impossible due to the problems associated with alignment of the engine and the generator. Thus, a need exists for an improved apparatus and method of alignment.

SUMMARY OF THE INVENTION

An object of the present invention is to provide an improved apparatus and method for alignment of an engine and generator of a distribute generator systems.

These and other objects of the present invention will become apparent to those skilled in the art upon reference to the following specification, drawings, and claims.

The present invention intends to overcome the difficulties encountered heretofore. To that end, a distributed generator system is provided having an alignment hub to assist in the alignment and securement of an engine and a generator of the system. The system comprises a distributed generator system having an engine and a single bearing generator, and an alignment hub for defining an alignment position between the engine and the generator and maintaining the alignment within a predetermined tolerance.

DETAILED DESCRIPTION OF THE INVENTION

In the Figures, a distributed generator system 10 is shown. The system is comprised of an engine 12, an electrical single bearing generator 14, and an adapter 16 located therebetween. The engine 12, preferably, is an internal combustion engine, and most preferably a gasoline powered engine that operates at relatively high rpms. However, those of ordinary skill in the art will understand that the invention is not so limited. The present invention can be adapted to any combination of drive components that require precision alignment and joinder.

Figure 1:
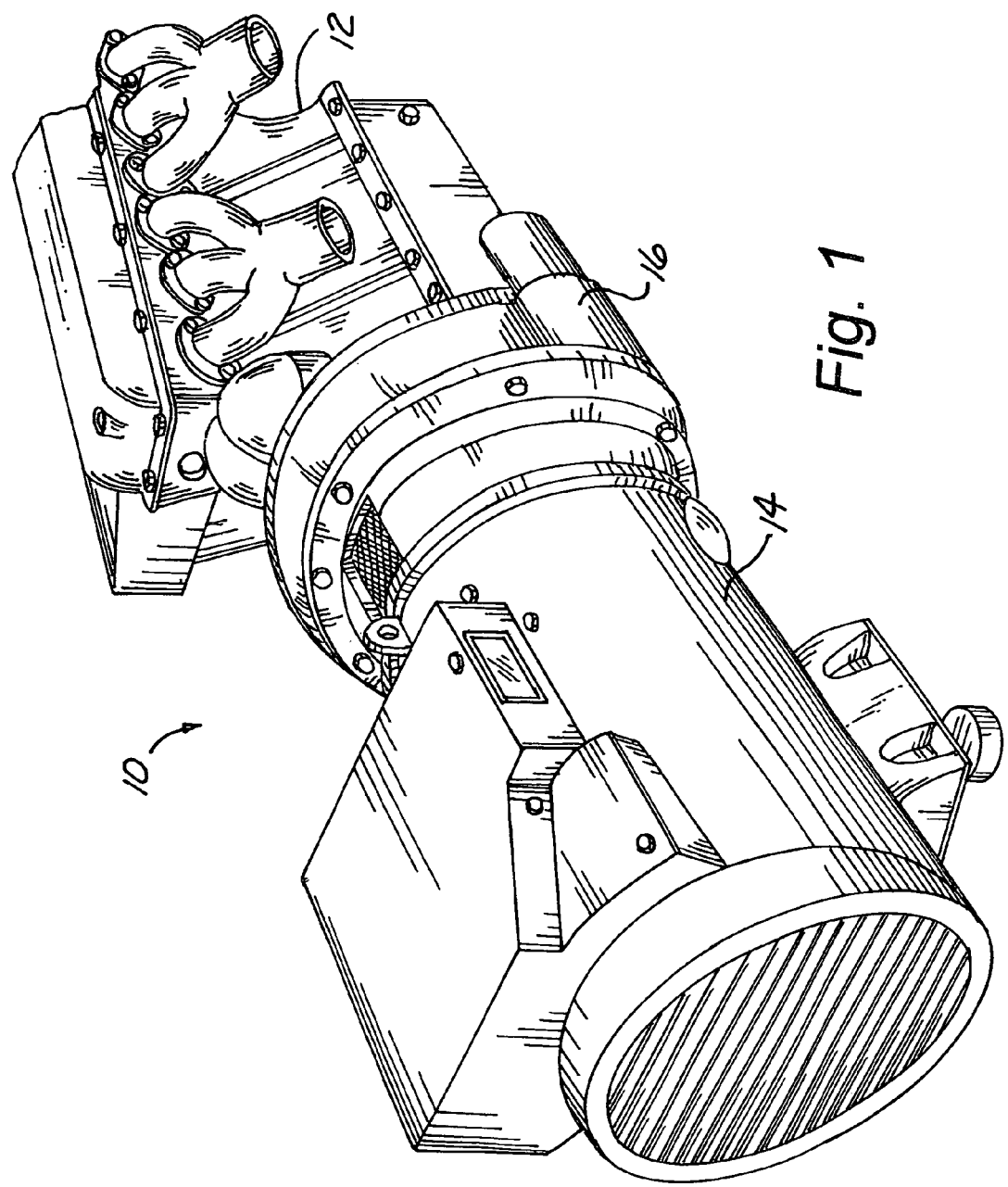
FIG. 1 is a perspective view of a distributed generator system comprised of an internal combustion engine and an electrical generator.
Figure 2:
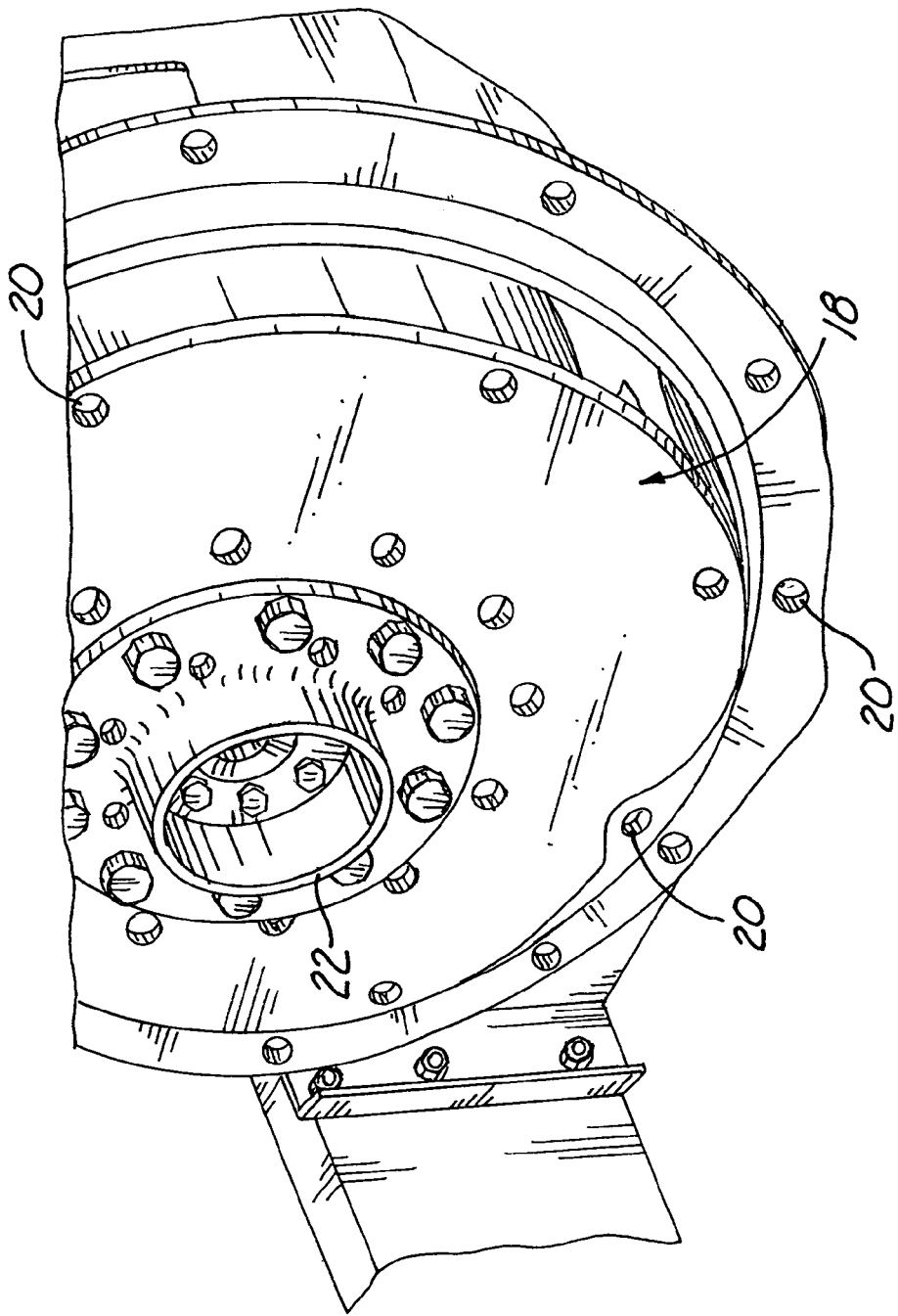
FIG. 2 is a perspective view of a flex plate of the generator.

FIG. 2 shows an end of the generator 14 that secures to the engine 12 via adapter 16. A flex plate 18 is connected thereto and forms the operative point of connection between the generator 14 and the engine 12. The flex plate 18 includes a plurality of circumferentially and perimeterlly located boltholes 20. A flex plate projection 22 is located about the center of the flex plate 18, and extends outward from the generator 14 toward the engine 12. The flex plate projection 22 is centered about the generator rotor shaft (not shown). In some applications, the flex plate projection 22 is bolted to the flex plate 18 as shown in FIG. 2. In others, however, the flex plate projection 22 could be machined on, or welded to the flex plate 18.

Figure 3:
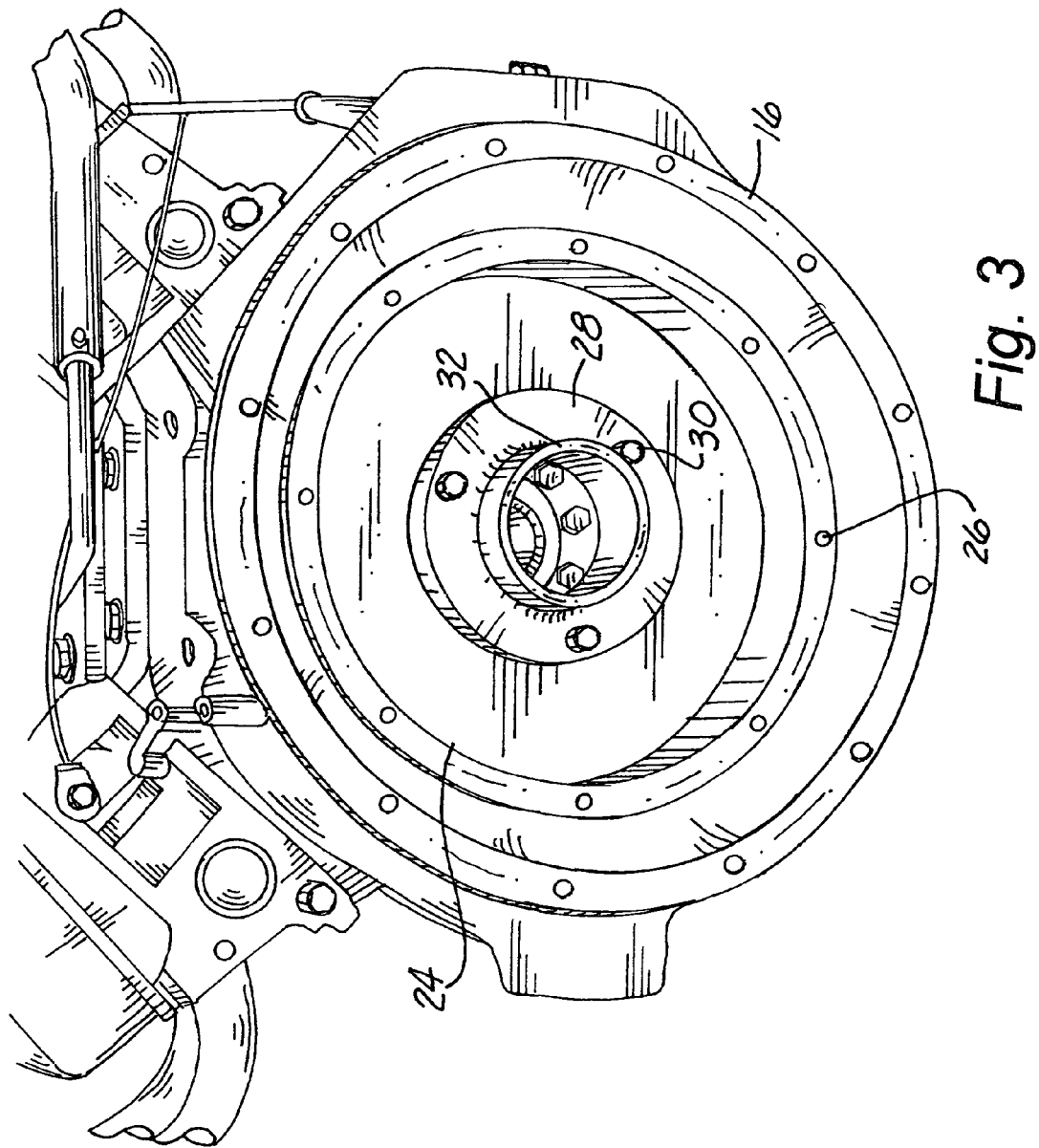
FIG. 3 is a perspective view of a flywheel of the engine.

FIG. 3 shows an end of the engine 12 that secures to the generator 14 via adapter 16. A flywheel 24 is connected thereto and forms the operative point of connection between the engine 12 and the generator 14. The flywheel 24 includes a plurality of circumferentially and perimeterlly located boltholes 26, which generally align with the boltholes 20 of the flex plate 18. An alignment hub 28 is affixed through boltholes 34 to the center of the flywheel 24. The alignment hub 28 is centered about the crankshaft (not shown) of the engine 12. The alignment hub 28 bolts to the flywheel 24 in place of the power take off bearing holder (not shown). The alignment hub 28 includes a center projection 32 that extends outward from the engine 12 toward the generator 14. The center projection 32 is centered about the crankshaft of the engine 12.

Figure 4:
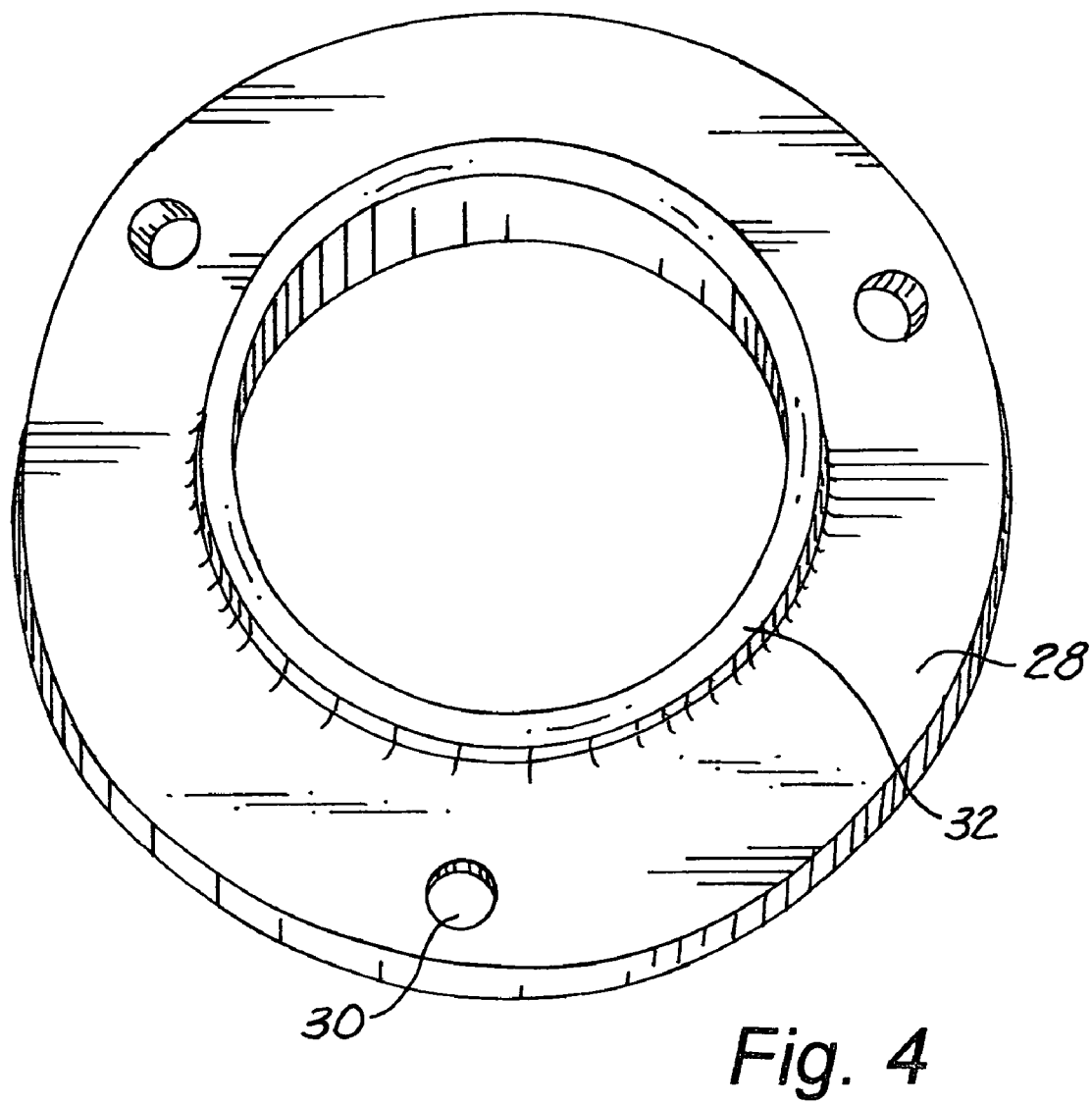
FIG. 4 is a perspective view of an alignment hub.

FIG. 4 shows a more detailed view of the alignment hub 28.

In prior art systems the flywheel 24 and flex plate 18 are merely bolted together. Generally, and attempt is made to machine the boltholes 26, 20 to align the flywheel 24 and flex plate 18. In practice, however, this is frequently not the case, and even if it is, this is insufficient to reduce misalignment and the associated vibration to allow for relatively high rpm operation. As stated, the weight of the components and the stress of operation will quickly peen or distort the boltholes making any initial alignment (good or bad) unacceptable.

The present invention utilizes an alignment hub 28 that is precision machined to a tolerance that will maintain precise alignment between an engine 12 and generator 14. The center projection 32 of the alignment hub is machined such that the inner diameter of the center projection 32 is slightly larger than the outer diameter of the generator rotor shaft projection 22, such that the projection 32 fits over the projection 22. Preferably, the alignment hub 28 fits with +/−0.001 inches into the center of the flywheel 24, and the alignment hub 28 fits over the generator rotor shaft center projection 22 with a tolerance of +/−0.003 inches and most preferable less than 0.004 inches. Those of ordinary skill in the art will understand that the alignment hub 28 could fit within the generator rotor shaft projection 22 without departing from the scope of the invention.

In this manner, the alignment hub 28 acts as a guide to align the crankshaft of the engine 12 with the rotor shaft of the generator 14. The tolerance between the alignment hub 28 and the generator rotor shaft projection 22 is such that alignment will be precise enough to ensure low vibration operation at even relatively high rpms. Furthermore, the overlap between the alignment hub projection 32 and the generator rotor shaft projection 22 will not allow the operational stress or the weight of the components to vary the alignment by any significant degree. The tight tolerance between the alignment hub projection 32 and the generator rotor shaft projection 22 will not allow the flywheel 24 and the flex plate 18 to deviate enough to degrade alignment. Even if the projections 22, 32 touch each other this would not degrade performance due to the fact that the flywheel 24 and flex plate 18 move together. This is a very low friction point. Furthermore, lubrication can be used to reduce friction even more.

The overlap between projections 22, 32 will prevent the system 10 from coming out of alignment, will prolong the life of the system 10 by preventing the destructive effects of vibration, and acts as a safety feature as well. In the event that the bolts that secure the flywheel 24 to the flex plate 18 loosen or sheer, the overlap will prevent separation of the engine 12 and the generator for a sufficient period of time to safely shutdown the system 10. For this reason, the alignment hub 28 is constructed of a very rigid metal material, such as steel.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

The invention claimed is:

1. A distributed generator system having an alignment hub to assist in the alignment and securement of an engine and a generator of said system, comprising:
   (a) a drive shaft rotated by the engine;
   (b) a flywheel connected to and rotated by the drive shaft about an axis of rotation;
   (c) a single bearing generator;
   (d) a projection of the generator having a circular cross section including a cylindrical surface having a projection diameter and which is extended toward the engine in the direction of the axis of rotation of the generator; and
   (e) an alignment hub, having a circular cross section including a cylindrical surface having an alignment hub diameter, secured to the flywheel and centered on the axis of rotation of the flywheel in alignment with and overlapping the projection of the flex plate to define a gap within a predetermined tolerance between the cylindrical surface of the alignment hub and the cylindrical surface of the projection to allow movement of the alignment hub relative to the projection along the axis of rotation.

2. A system as defined in claim 1 wherein said engine operates at greater than 2000 rpm.

3. A system as defined in claim 2 wherein the gap is of a size to prevent damaging harmonics in the single bearing generator.

4. A system as defined in claim 1 wherein the projection diameter is an outer diameter and the alignment hub diameter is an inner diameter that is less than the projection diameter.

5. A system as defined in claim 1 wherein the projection diameter is an inner diameter and the alignment hub diameter is an outer diameter that is greater than the projection diameter.

6. A method for aligning the engine and generator of a distributed generator system including an engine that rotates a flywheel about an axis of rotation and a generator including a flex plate releasably mounted to the flywheel and having an axis of rotation, comprising the steps of:
   (a) forming a projection on the flex plate having a circular cross section including a cylindrical surface with a projection diameter and extended in the direction of the axis of rotation of the flex plate and centered on the axis of rotation of the flex plate;
   (b) forming an alignment hub on the flywheel having a circular cross section including a cylindrical surface with an alignment hub centered on the axis of rotation of the flywheel;
   (c) positioning the engine and generator in proximity to each other with the axis of rotation of the flywheel in rough alignment with the axis of rotation of the flex plate;

(d) moving the engine and generator toward each other generally along the roughly aligned axes of rotation to bring the cylindrical surface of the alignment hub adjacent the cylindrical surface of the projection to bring the axes of rotation of the engine and the generator into tight alignment; and (e) securing the engine to the generator.

7. A method as defined in claim 6 wherein the projection diameter is an outer diameter and the alignment hub diameter is an inner diameter that is less than the projection diameter.

8. A method as defined in claim 6 wherein the projection diameter is an inner diameter and the alignment hub diameter is an outer diameter that is greater than the projection diameter.

* * * * *